(12) United States Patent
Grandle

(10) Patent No.: US 9,372,992 B1
(45) Date of Patent: Jun. 21, 2016

(54) ENSURING INTEGRITY OF A SOFTWARE PACKAGE INSTALLER

(71) Applicant: The Boeing Company, Chicago, IL (US)

(72) Inventor: John Patrick Grandle, Renton, WA (US)

(73) Assignee: The Boeing Company, Chicago, IL (US)

( * ) Notice: Subject to any disclaimer, the term of this patent is extended or adjusted under 35 U.S.C. 154(b) by 71 days.

(21) Appl. No.: 14/482,746

(22) Filed: Sep. 10, 2014

(51) Int. Cl.
| | |
|---|---|
| *G06F 11/00* | (2006.01) |
| *G06F 21/57* | (2013.01) |
| *G06F 9/445* | (2006.01) |
| *G06F 21/56* | (2013.01) |

(52) U.S. Cl.
CPC ........ *G06F 21/57* (2013.01); *G06F 8/61* (2013.01); *G06F 21/565* (2013.01)

(58) Field of Classification Search
CPC ....... G06F 21/10; G06F 21/105; G06F 21/12; G06F 21/121; G06F 21/44; G06F 21/57; G06F 21/565; G06F 8/61; H04L 63/1416; H04L 63/1433
USPC .............................. 726/22–26; 713/181, 191
See application file for complete search history.

(56) References Cited

U.S. PATENT DOCUMENTS

| | | | | |
|---|---|---|---|---|
| 5,860,012 A | * | 1/1999 | Luu | G06F 8/60 709/220 |
| 6,385,766 B1 | * | 5/2002 | Doran, Jr. | G06F 8/63 707/999.202 |
| 6,535,915 B1 | * | 3/2003 | Valys | G06F 8/61 709/221 |
| 9,189,357 B2 | * | 11/2015 | Vidal | G06F 8/65 |
| 2012/0246721 A1 | * | 9/2012 | Viljoen | G06F 21/577 726/22 |

OTHER PUBLICATIONS

"Novell ZENworks Application Virtualization Best Practices Guide—Packaging-Snapshot Method" http://www.novell.com/documentation/zav10/zav10_best_practices/data/bycvvaa.html (Mar. 2014).
"Using RPM to Verify Installed Packages" http://www.rpm.org/max-rpm-snapshot/ch-rpm-verify.html (downloaded Aug. 2014).

* cited by examiner

*Primary Examiner* — Hosuk Song
(74) *Attorney, Agent, or Firm* — Miller, Matthias & Hull LLP

(57) ABSTRACT

A method comprises capturing a first state of a computer prior to installing a software package on the computer; using an installer to install the software package on the computer; capturing a second state of the computer after installation of the software package; and identifying file differences between the first and second states to ensure integrity of the installation.

20 Claims, 3 Drawing Sheets

ENSURING INTEGRITY OF A SOFTWARE PACKAGE INSTALLER

BACKGROUND

An installer manages the installation of software packages on a computer, manages the additions and deletions of software components, monitors file resiliency, and maintains basic disaster recovery by using rollbacks.

A rollback typically involves utilizing a snapshot of the computer's file system. The snapshot is captured prior to installation of a software package. If the software package is not installed successfully, the snapshot may be used to restore the file system to the state prior to the installation.

An installer may be customized. However, a poorly designed customization can result in files being installed in incorrect locations. A poorly designed customization can go undetected.

A malicious customization can result in existing files on the computer being moved, deleted or replaced. Valuable data can be lost, control of the computer can be compromised, and system stability can be affected. A malicious customization can go undetected.

SUMMARY

According to an embodiment herein, a method comprises capturing a first state of a computer prior to installing a software package on the computer; using an installer to install the software package on the computer; capturing a second state of the computer after installation of the software package; and identifying file differences between the first and second states to ensure integrity of the installation.

According to another embodiment herein, a computer comprises a processor and data storage encoded with code. When executed, the code causes the processor to capture a first state of the computer, install a software package on the computer using customized actions, capture a second state of the computer, and identify file differences between the first and second states to identify any integrity violations by the customized actions.

According to another embodiment herein, an article comprises non-transient computer readable memory encoded with a software package installer that is customized with custom actions. The memory is further encoded with code for capturing a first snapshot of a computer, thereafter using the installer to install a software package on the computer, capturing a second first snapshot of the computer after the software package has been installed, and identifying file differences between the first and second states to identify any integrity violations by the software package installer.

These features and functions may be achieved independently in various embodiments or may be combined in other embodiments. Further details of the embodiments can be seen with reference to the following description and drawings.

DETAILED DESCRIPTION

Figure 1:
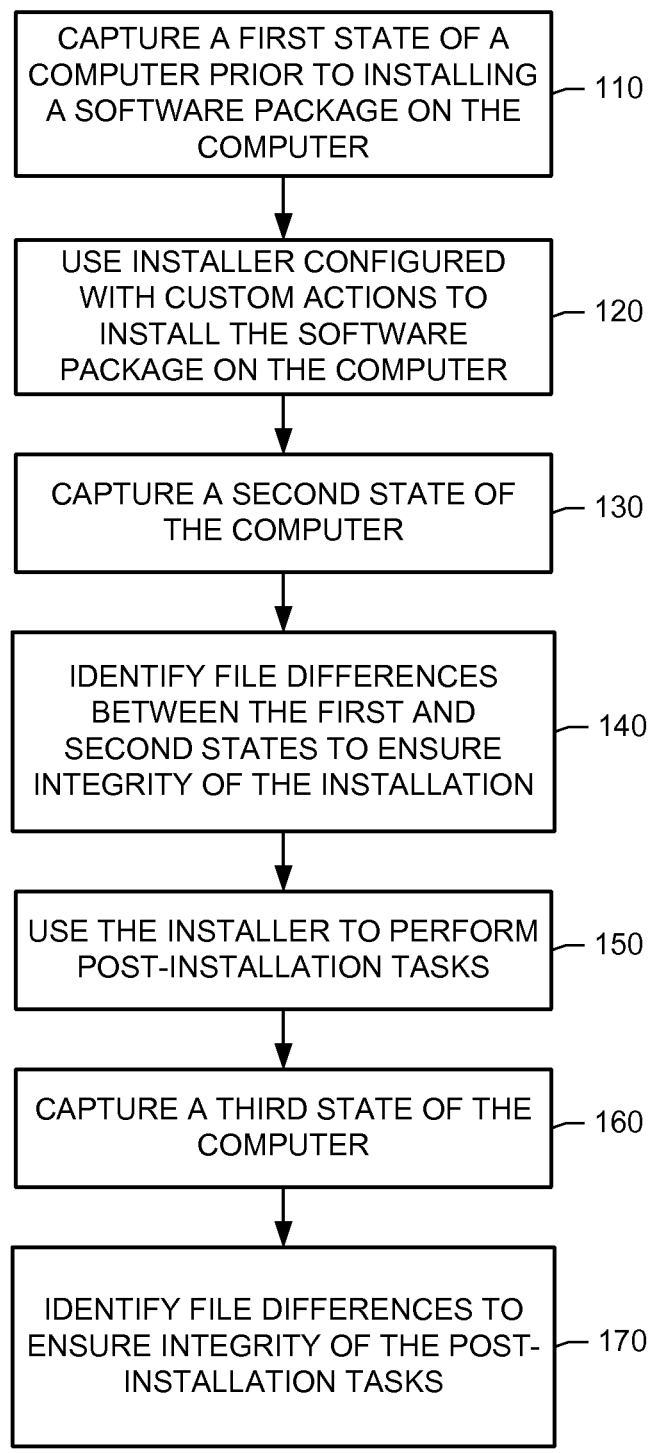
FIG. 1 is an illustration of a method of ensuring integrity of a software package installer.

FIG. 1 illustrates a method of ensuring integrity of a software package installer (also known as a package manager), which installs software packages on a computer. A software package typically includes an archive of files and metadata used to install and erase the archive files. The metadata may include helper scripts, file attributes, and descriptive information about the software package.

The installer performs all installation-related tasks, including copying files to a hard disk or other data storage device, making registry modifications, and displaying dialog boxes to prompt for user installation preferences. The installer also performs all post-installation tasks, including removing files that were created to support the installation.

The installer may be run on the computer as a local administrator, or it may be run on a server as a server/network administrator. Either way, the computer, its local resources, and network resources are available to whatever is executed in the installer.

In a Windows-based operating system, Windows Installer may be used to install software packages. Present versions of Windows Installer are divided into two parts: a client-side installer component (Msiexec.exe) and a Microsoft Software Installation (MSI) package file. Windows Installer uses information contained in a package file to install the package. The client-side component is called by a Setup program, uses a dynamic link library (e.g., Msi.dll) to read the package files, applies any transform files, and incorporates command-line options supplied by the Setup program.

In addition to providing many built-in actions for performing installation, Windows Installer also allows for custom actions. For instance, a custom action may be added to launch an executable file during installation that is installed on the computer. A custom action can be executed as the local administrator or the server/network administrator.

The custom actions are typically performed after the file structure is laid out, the registry is set, and shortcuts are generated. The custom actions can create problems where environmental variables are not compensated for or where malicious but undetected actions are taken. Consider the following problems.

a. A local account is added with inappropriate permission such as a local administrator account.
   b. A rootkit is added. The rootkit may include malicious software that is designed to hide the existence of certain processes or programs from normal methods of detection and enable continued privileged access to a computer.
   c. Malware, spyware, trojans, worms or viruses are added
   d. Data is transmitted from a local machine to a network location to show that a secured file was accessed.
   e. Files for unrelated applications or files that are used by the operating system are deleted.

Reference is now made to FIG. 1, which illustrates the method of ensuring integrity of the software package installer. The method may or may not modify the custom actions to ensure that the installation is performed properly and that no malicious actions are taken. At a minimum, however, the method ensures the integrity of the installation by identifying files affected by a poorly designed customization and/or a malicious customization.

At block 110, a first state of the computer is captured prior to installing a software package on the computer. A state of the computer refers to its entire machine state, including memory, disk space, processor execution state, registry, etc.

The state may be captured by taking a snapshot of the computer. A snapshot is typically used to roll back the computer to its state at the time the snapshot was captured. Windows-based and other operating systems provide support for taking snapshots.

At block 120, the installer is used to install the software package on the computer. The installer may be configured to use custom actions during the installation.

At block 130, a second state of the computer is captured after installation of the software package.

At block 140, file differences between the first and second states are identified to ensure integrity of the installer during the installation. The term "file differences" refers to one or more of (a) changes to content and/or metadata of one or more files on the computer; (b) addition of one or more files on the computer; (c) deletion of one or more files on the computer; and (d) movement of one or more files on the computer. For instance, if a comparison of the first and second states reveals a difference in content or attributes of at least one file, then an integrity violation is identified.

Figure 2:
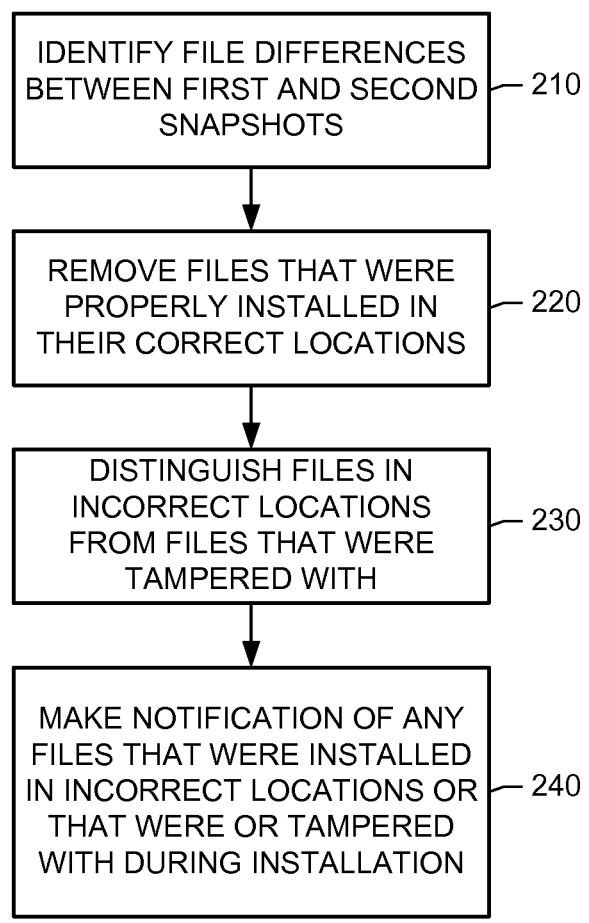
FIG. 2 is an illustration of a method of identifying files that were tampered with and files that were installed in wrong locations during installation of a software package.

Reference is made to FIG. 2, which illustrates an example of a method of ensuring integrity of installation of a software package. Specifically, FIG. 2 illustrates the use of the first and second snapshots to identify files that were tampered with and files that were installed in wrong locations during installation of a software package.

At block 210, file differences between the first and second snapshots are identified by a binary comparison of content and metadata of each file in the first snapshot to its corresponding file in the second snapshot. The files may include the registry. For instance, a Windows-based registry may be stored in a database located at %windir%\System32\config.

The binary comparison identifies all files that were added, deleted, or moved during the installation. These identified files include files that were tampered with, and files that were installed. A list or other data structure (hereinafter "list") may be used to keep track of the identified files. The list may include relative path, file name, content and metadata of each identified file.

Of the files on the list, certain files may be removed if only certain file attributes are changed. For instance, files whose date stamps have changed may be ignored because the date stamps may have little relevance to the integrity of a file, and may change even though file content has not been modified.

At block 220, files that were properly installed in their correct locations are removed from the list. The software package may provide information about the files that should be installed as well as the correct locations of the files.

To determine whether the files were stored in their correct locations, a duplicate folder/file structure may be created, and a one-to-one comparison is performed between the duplicate file structure and the files installed on the computer. The duplicate structure may be placed in a directory that is to be treated as the root of the drive. For example, a duplicate structure called "\sandbox\Program Files\newPackage\" may be created. The \sandbox\ location may be on the computer on the same drive or on a networked location, as it is not going to be affected during the installation. If the package is installed correctly, the structure "C:\Program Files\newPackage\" should match the duplicate structure "\sandbox\Program Files\newPackage\".

The list is updated to remove files that were properly installed in their correct locations. The updated list now identifies those files that were tampered with and those files installed in incorrect locations.

At block 230, the list is further updated to distinguish files installed in their incorrect locations from files that were on the computer prior to software package installation, but were tampered with. (The sandbox approach at block 220 also identifies those files that were installed in their incorrect locations.) After further updating, the list identifies the files that were tampered with during the installation.

At block 240, notification may be made of any source files that were installed in the incorrect location and any filed that were tampered with. Notification may be made in a variety of ways. As examples, the names of the files may be displayed onscreen to an administrator or sent to the administrator via e-mail, the names of the files may be entered into a log or database, the names of the files may be displayed on a web site, etc.

Reference is once again made to FIG. 1. Integrity of the software package installer may also be verified during performance of post-installation tasks. For example, the method may be extended to ensure that files created solely to support the installation have been removed from the computer, and that no files on the computer have been tampered with during the post-installation tasks.

At block 150, the installer is used to perform post-installation tasks. These tasks may include custom actions, which may create the same problems as custom actions during the installation.

At block 160, a third state of the computer is captured. At block 170, the third state is used to identify file differences to ensure integrity of the post-installation tasks.

Figure 3:
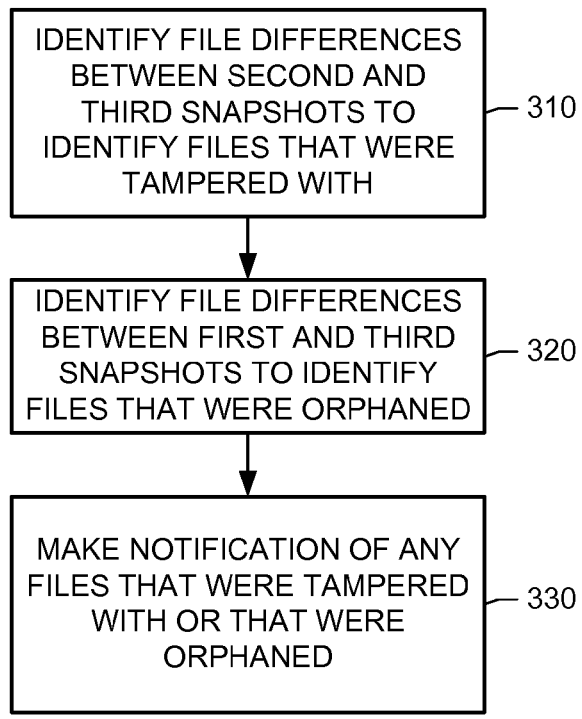
FIG. 3 is an illustration of a method of identifying files that were orphaned and tampered with during post-installation tasks.

Reference is made to FIG. 3, which illustrates an example of a method of ensuring integrity of post-installation tasks. Specifically, FIG. 3 illustrates the use of a third snapshot for the third state of the computer. The third snapshot is used to identify files that were orphaned or tampered with during the post-installation tasks. Orphaned files refers to files that should have been removed during post-installation, but weren't.

At block 310, file differences in second and third snapshots are identified by a binary comparison of content and metadata of each file in the second state to its corresponding file in the third state. This comparison yields a second list of files that should have been removed during post-installation tasks and also all files that were tampered with during the post-installation tasks. Since all files that should have been removed during post installation are known or may be deduced, the second list is updated to identify only those files that were tampered with during the post-installation tasks.

At block 320, the third snapshot is compared to the first snapshot. File differences from this comparison yields a third list of files. The third list identifies all files that were added during the installation, all files that were tampered with, and all orphaned files. The files that were added is known, and the filed that were tampered with was determined at block 310. Therefore, the third list may be updated by removing those files that were tampered with and those files that were installed. The remaining files on the updated third list include orphaned files.

At block 330, notification may be made of any files that were tampered with or orphaned. Notification may be made as described above (see block 240).

The methods of FIGS. 2 and 3 make use of snapshots to capture computer states. An alternative to using snapshots is computing a hash value for each file stored in the computer. File differences in hash values may be computed by a hash algorithm such as the Secure Hash Algorithm (SHA) and stored in an array along with their locations in the folder structure to be used for comparisons. The hash flies are not quite as accurate as snapshots due to possible collisions, but the analysis is faster as the strings being compared are much shorter.

Figure 4:
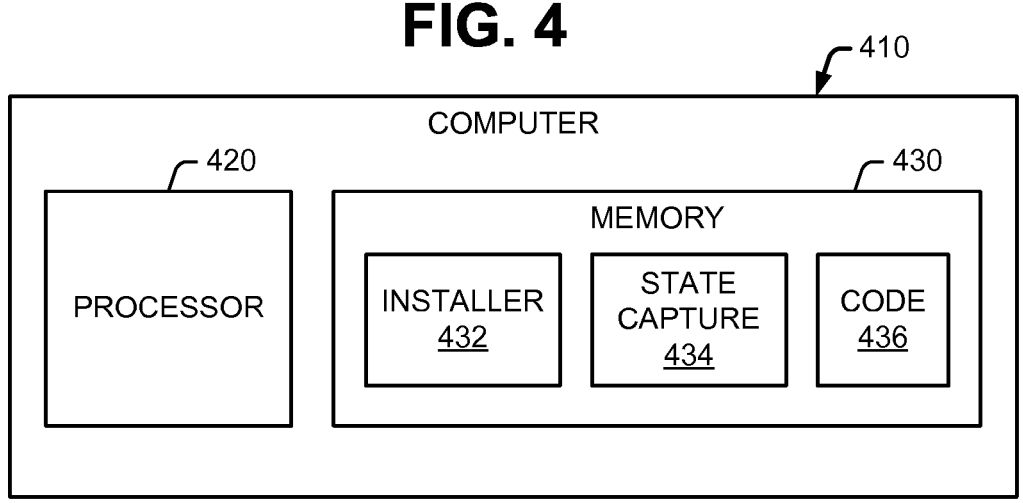
FIG. 4 is an illustration of a computer that is programmed to ensure integrity of a software package installer.

Reference is now made to FIG. 4, which illustrates an example of a computer 410 that is programmed to ensure integrity of a software package installer. The computer 410 includes a processor 420 and memory 430 that stores an operating system and application programs.

The operating system and/or application programs may include a software package installer 432, a component 434 for taking snapshots or otherwise capturing the state of the computer 410, and executable code 436 for executing the method of FIG. 1. The code 436 may be executed as a script. In the alternative, the code 436 may be compiled. The operating system and/or application programs may enable a local administrator to run the code 436.

The computer 410 may have a network interface. The operating system may be configured to allow the method of FIG. 1 to be run on a server as a server/network administrator.

The computer 410 is not limited to any particular type. Examples include flight computers, personal computers, work stations, laptop computers, and smart mobile devices.

The invention claimed is:

1. In a computer, a method comprising:
   capturing a first state of the computer prior to installing a software package on the computer;
   using an installer to install the software package on the computer;
   capturing a second state of the computer after installation of the software package;
   identifying file differences between the first and second states, including maintaining a list of files that were changed between the first and second computer states;
   updating the list to remove those files that were properly installed in their correct locations; and
   distinguishing between those files on the list that were tampered with and those files on the list that were installed in incorrect locations.

2. The method of claim 1, wherein the installer uses custom actions to install the software package.

3. The method of claim 1, wherein the files include content and metadata; and wherein identifying the file differences includes a binary comparison of the content and metadata of each file in the first state to its corresponding file in the second state.

4. The method of claim 1, wherein a duplicate structure of the installed files is created in a sandbox and a one-to-one comparison is performed between the files in the sandbox and the files installed on the computer.

5. The method of claim 1, further comprising notifying an administrator of those files that were tampered with and those files that were installed in incorrect locations.

6. The method of claim 1, further comprising capturing a third state of the computer after the installer performs post-installation tasks; and using the third computer state to ensure integrity of the post-installation tasks.

7. The method of claim 6, wherein using the third computer state includes identifying file differences between the second and third computer states to identify files that were tampered with during the post-installation tasks.

8. The method of claim 7, wherein using the third computer state further includes identifying file differences between the first and third computer states to identify files that were orphaned during the post-installation tasks.

9. A computer comprising:
   a processor; and
   data storage encoded with code that, when executed, causes the processor to capture a first state of the computer, install a software package on the computer using customized actions, capture a second state of the computer, and identify file differences between the first and second states to identify any integrity violations by the customized actions, wherein a list of files that were changed between the first and second computer states is maintained; the list is updated to remove those files that were properly installed in their correct locations; and those files on the list that were tampered with are distinguished from those files on the list that were installed in incorrect locations.

10. The computer of claim 9, wherein the code causes the processor to create a duplicate structure of the installed files in a sandbox, and perform a one-to-one comparison between the files in the sandbox and the files installed on the computer.

11. The computer of claim 9, wherein the code further causes the processor to capture a third state of the computer after post-installation tasks have been performed; and use the third computer state to ensure integrity of the post-installation tasks.

12. The computer of claim 11, wherein file differences between the second and third computer states are used to identify files that were tampered with during the post-installation tasks.

13. The computer of claim 12, wherein file differences between the first and third computer states are used to identify files that were orphaned during the post-installation tasks.

14. The computer of claim 9, further comprising making a notification of any integrity violations.

15. An article comprising non-transient computer readable memory encoded with a software package installer that is customized with custom actions; the memory further encoded with code for capturing a first snapshot of a computer, thereafter using the installer to install a software package on the computer, capturing a second snapshot of the computer after the software package has been installed, and identifying file differences between the first and second states to identify any integrity violations by the software package installer, wherein a list of files that were changed between the first and second computer states is maintained; the list is updated to remove those files that were properly installed in their correct locations; and those files on the list that were tampered with are distinguished from those files on the list that were installed in incorrect locations.

16. The article of claim 15, wherein the code also captures a third snapshot of the computer after post-installation tasks have been performed; and use the third snapshot to ensure integrity of the post-installation tasks.

17. The article of claim 16, wherein file differences between the second and third snapshots are used to identify files that were tampered with during the post-installation tasks.

18. The article of claim 17, wherein file differences between the first and third snapshots are used to identify files that were orphaned during the post-installation tasks.

19. The article of claim 15, wherein the code creates a duplicate structure of the installed files in a sandbox, and perform a one-to-one comparison between the files in the sandbox and the files installed on the computer.

20. The article of claim 15, wherein the code makes a notification of any integrity violations.

* * * * *